US008277943B2

(12) United States Patent
Viasnoff et al.

(10) Patent No.: US 8,277,943 B2
(45) Date of Patent: *Oct. 2, 2012

(54) THIN FILMS WITH HIGH NEAR-INFRARED REFLECTIVITY DEPOSITED ON BUILDING MATERIALS

(75) Inventors: Emilie Viasnoff, Sevres (FR); Ming Liang Shiao, Collegeville, PA (US)

(73) Assignee: Certainteed Corporation, Valley Forge, PA (US)

( * ) Notice: Subject to any disclaimer, the term of this patent is extended or adjusted under 35 U.S.C. 154(b) by 526 days.

This patent is subject to a terminal disclaimer.

(21) Appl. No.: 12/545,912

(22) Filed: Aug. 24, 2009

(65) Prior Publication Data

US 2010/0047566 A1     Feb. 25, 2010

Related U.S. Application Data

(63) Continuation-in-part of application No. 11/163,103, filed on Oct. 5, 2005, now Pat. No. 7,592,066.

(51) Int. Cl.
| *B32B 27/00* | (2006.01) |
| *B32B 15/04* | (2006.01) |
| *B05D 3/00* | (2006.01) |
| *C23C 16/00* | (2006.01) |
| *C23C 4/10* | (2006.01) |
| *C23C 4/08* | (2006.01) |

(52) U.S. Cl. .................. 428/411.1; 428/421; 428/423.1; 428/425.8; 428/457; 428/461; 428/500; 427/248.1; 427/294; 427/421.1; 427/446; 427/453; 427/455

(58) Field of Classification Search .......................... None
See application file for complete search history.

(56) References Cited

U.S. PATENT DOCUMENTS

| 2,732,311 | A | 1/1956 | Hartwright |
| 4,038,239 | A | 7/1977 | Coyner et al. |
| 4,717,614 | A | 1/1988 | Bondoc |
| 4,916,014 | A | 4/1990 | Weber et al. |
| 5,595,813 | A | 1/1997 | Ogawa et al. |
| 6,387,446 | B1 | 5/2002 | Lobmann et al. |
| 6,680,134 | B2 | 1/2004 | Maurer et al. |
| 7,132,143 | B2 | 11/2006 | Zanchetta et al. |
| 7,592,066 | B2 * | 9/2009 | Shiao et al. ................. 428/411.1 |
| 2003/0068469 | A1 | 4/2003 | Aschenbeck |
| 2003/0152747 | A1 | 8/2003 | Fensel |
| 2005/0072110 | A1 | 4/2005 | Shiao et al. |
| 2005/0072114 | A1 | 4/2005 | Shiao et al. |
| 2005/0238561 | A1 | 10/2005 | Beier et al. |
| 2006/0243388 | A1 | 11/2006 | Kubiak et al. |
| 2007/0077361 | A1 | 4/2007 | Shiao et al. |
| 2007/0218251 | A1 | 9/2007 | Jacobs et al. |
| 2008/0292872 | A1 | 11/2008 | Boire et al. |
| 2009/0075067 | A1 | 3/2009 | Myli et al. |
| 2009/0075069 | A1 | 3/2009 | Myli et al. |

FOREIGN PATENT DOCUMENTS

| CN | 201109755 | 9/2008 |
| GB | 2324098 | 10/1998 |

* cited by examiner

*Primary Examiner* — Sheeba Ahmed
(74) *Attorney, Agent, or Firm* — Woodcock Washburn LLP

(57) ABSTRACT

Disclosed are solar-reflective roofing and other building materials having high reflectance of near-infrared radiation and high transmission of radiation in the visible light range and a substantial emissivity so as to reduce the heat island effects experienced by the articles while also maintaining an aesthetically pleasing appearance. Also disclosed are related methods for fabrication of such materials.

31 Claims, 3 Drawing Sheets

US 8,277,943 B2

THIN FILMS WITH HIGH NEAR-INFRARED REFLECTIVITY DEPOSITED ON BUILDING MATERIALS

RELATED APPLICATIONS

This application is a continuation-in-part of U.S. application Ser. No. 11/163,103 (titled "Roofing Articles With Reflective Thin Films and the Process of Producing the Same," and published as US 2007/0077361A1), filed Oct. 5, 2005 and allowed on May 27, 2009, the entirety of which is incorporated herein by reference.

FIELD OF THE INVENTION

The present invention relates to the fields of building materials and to coatings capable of reflecting near-infrared radiation while transmitting radiation in the visible light spectrum.

BACKGROUND OF THE INVENTION

Sloped roofs are typically covered with mineral-surfaced asphalt shingles, such as those described in ASTM D225 ("Standard Specification for Asphalt Shingles (Organic Felt) Surfaced with Mineral Granules") or D3462 ("Standard Specification for Asphalt Shingles Made From Glass Felt and Surfaced with Mineral Granules"), to provide a water-shedding function while adding an aesthetically pleasing appearance to the roofs.

Such asphalt shingles are normally made from asphalt-impregnated fabrics. The shingles also typically include colored roofing granules to provide aesthetically pleasing coloration to the shingles as well as to impart strength and durability to the shingles. The roofing granules are typically also used in asphalt-based roofing articles to help protect the asphalt from the effects of incident ultraviolet radiation.

It is known in the art, however, that conventional roofing materials, such as the described asphaltic shingles, reflect little near-infrared ("NIR" radiation; λ=about 700 nm to about 2500 nm) radiation and consequently absorb substantial solar heat. This absorption increases with dark-colored shingles; while white or lighter colored asphalt shingles may have a solar reflectance in the range of about 25% to about 35%, dark-colored asphalt shingles may have a solar reflectance of only about 5 to about 15%. This absorption of solar heat typically results in elevated temperatures in the environment surrounding the shingle.

This elevation in temperature in turn gives rise to so-called heat-island effects that increase the need for energy-consuming cooling systems to offset these heat-island effects. Heat-island effects caused by the solar heat absorption of a dark-colored roofing article can be significant—temperatures as high as 77° C. have been observed on the surface of black roofing shingles on a sunny day having an ambient temperature of only about 21° C.

Several efforts have been made to address the challenges created by the described heat-island effects. Some have proposed incorporation of application of white- or light-colored pigments or coatings directly to roofing articles to enhance the articles' reflectivity. Consumers of roofing materials, however, show a preference for black or dark-colored roofing articles.

Others have proposed roofing articles or granules having metal flakes, such as aluminum flakes, adhered to their surfaces, to provide a radiation-reflective surface. Such approaches, however, impart reflectivity to the roofing article and are not aesthetically pleasing to consumers.

Some solutions to the heat-island problem include the use of infrared-reflective pigments, known in the art as "cool pigments," on roofing articles to provide the roofing articles with desired levels of color and of NIR reflectance. These "cool pigments," however, have certain drawbacks. First, dark-colored "cool pigments," while aesthetically desirable, are comparatively high in cost, present a limited solar reflectance, and are not available in jet-black hues. Others have suggested to use of roofing articles having NIR-transparent pigments disposed atop a NIR-reflective substrate. These solutions, however, are also high in cost and display limited solar reflectance when manufactured in the dark hues typically preferred by consumers.

Accordingly, there is an ongoing need in the field for improved roofing materials, such as shingles, that possess desirable NIR reflectance characteristics while also providing an aesthetically pleasing appearance and allowing for the construction of dark-colored roofing articles. There is also a related need for processes capable of producing such improved roofing materials.

SUMMARY OF THE INVENTION

In meeting the above-described challenges, the present invention first provides roofing articles, such articles including substrates having a surface at least partially surmounted by at least one thin film having a thickness in the range of from about 5 nm to about 5000 nm. Such thin films suitably transmit from about 5% to about 100% of radiation having a wavelength of between about 300 nm and about 700 nm, commonly known as "visible light" radiation, and suitably reflect from about 1% to about 100% of radiation having a wavelength of between about 700 nm and about 2500 nm.

Also provided are methods of fabricating solar-reflective building materials, comprising providing a substrate having an upper surface and disposing onto at least a portion of the upper surface of the substrate at least one thin film having a thickness in the range of from about 5 nm to about 5000 nm. The at least one thin film suitably transmits from about 5% to about 100% of radiation having a wavelength of between about 300 nm and about 700 nm, and reflects from about 1% to about 100% of radiation having a wavelength of between about 700 nm and about 2500 nm.

The present invention also provides opaque building materials, which materials include a substrate at least partially surmounted by at least one thin film having a thickness in the range of from about 5 nm to about 5000 nm, the at least one thin film transmitting from about 5% to about 100% of radiation having a wavelength of between about 300 nm and about 700 nm, and the at least one thin film reflecting from about 1% to about 100% of radiation having a wavelength of between about 700 nm and about 2500 nm.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In a first aspect, the present invention provides roofing articles. The disclosed articles suitably include a substrate at least partially surmounted by at least one thin film having a thickness in the range of from about 5 nm to about 5000 nm. The at least one thin film suitably transmits from about 5% to about 100% of radiation having a wavelength of between about 300 nm and about 700 nm, and reflects from about 1% to about 100% of radiation having a wavelength of between about 700 nm and about 2500 nm. The roofing articles also suitably have an emissivity of at least about 75% in the medium-IR (wavelength >2500 nm) range.

Figure 1:
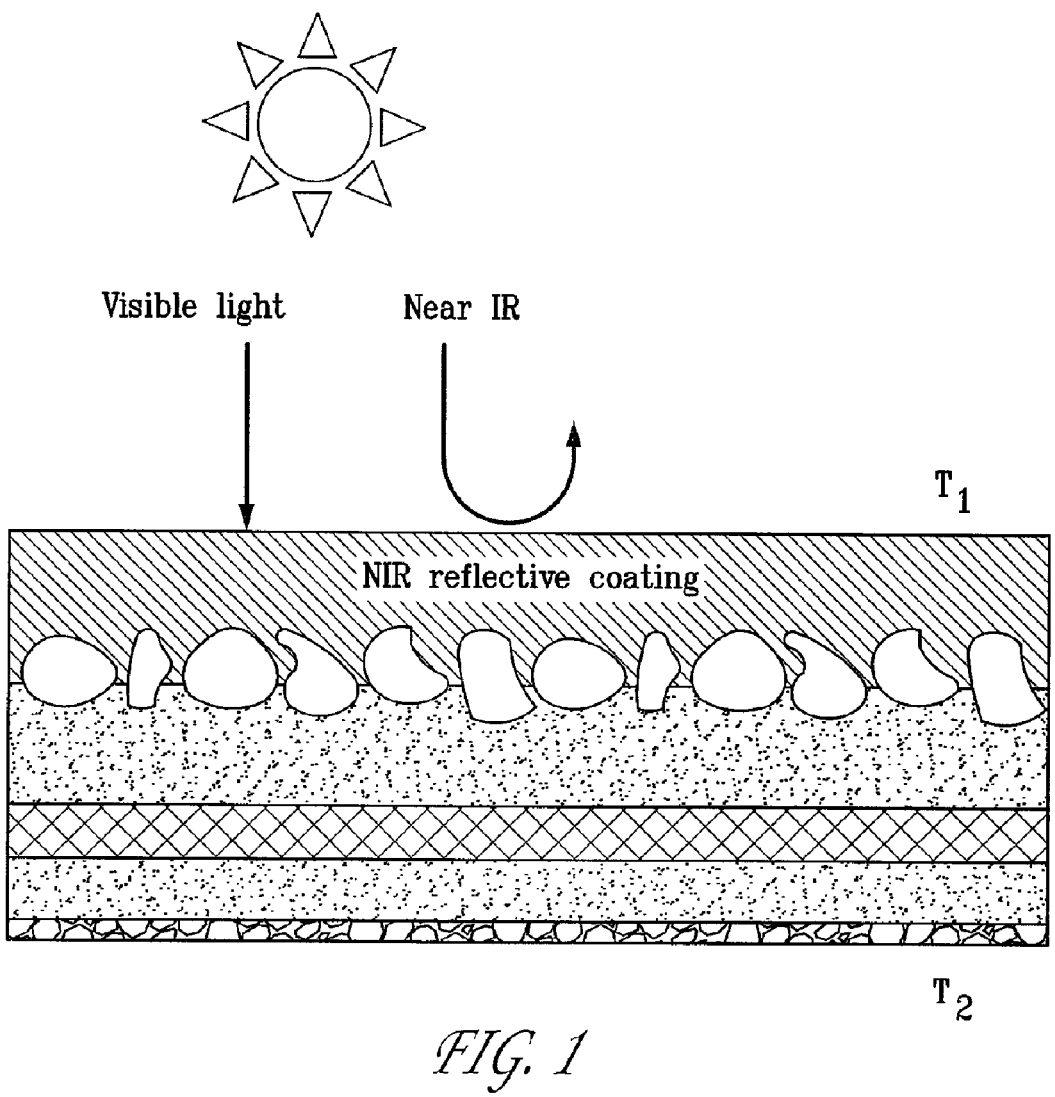
FIG. 1 depicts a schematic view of the operation of the disclosed roofing articles.

A non-limiting, schematic view of a representative article is shown in FIG. 1. As shown, a roofing article made according to the claimed invention is exposed to visible light and NIR radiation. The thin film coating then reflects at least a portion of the NIR radiation. This reflectance of NIR radiation at least partially avoids the heat island effect caused by absorption of NIR radiation, as described elsewhere herein.

The thin film, as shown in FIG. 1, additionally transmits at least a portion of radiation in the visible light range. This in turn enables one observing the roofing article to perceive the underlying color of the article. Such underlying color is suitably black, brown or another color that is aesthetically pleasing to consumers. The net effect of the article is to reduce the previously-described heat island effect and to maintain a temperature $T_2$ on the roof-side of the roofing article that is lower than the temperature $T_1$ on the environment-side of the roofing article where the article is exposed to solar radiation.

As shown in FIG. 1, the inventive articles may include multiple layers of material, including granules, that underlie the thin films. Roofing articles having only single layers of material underlying the thin films are also within the scope of the claimed invention. Thus, substrates may include one or more layers of material. The thin films may reside directly atop the base substrate material (e.g., a bare asphalt shingle), or may reside atop one or more layers, such as paint or sealants, that are disposed atop the base substrate material.

The thin films of the claimed invention may, in some embodiments, have a thickness in the range of from about 10 nm to about 1000 nm. The thin films may even be in the range of from about 20 nm to about 500 nm. Typical thicknesses are between about 20 nm to about 500 nm, although the optimal thickness for a particular embodiment will depend on the needs of the user and will be apparent to those of ordinary skill in the art.

The thin film typically conforms to the surface profile of the substrate, which substrates may include roofing granules or other structures. The film suitably presents an essentially flat surface, as shown in FIG. 1 to the environment exterior to the substrate, although presentation of an essentially flat surface is not always necessary, and the thin film may conform to the surface profile of the underlying substrate.

Granules are typically chemically inert materials, such as mineral particles, and are generally between sand and gravel in size, i.e., between about #8 U.S. mesh and #70 U.S. mesh, and more preferably with sizes ranging from #8 U.S. mesh to #40 U.S. mesh. Preferably, the mineral particles have an average particle size of from about 0.2 mm to about 3 mm, and more preferably from about 0.4 mm to about 2.4 mm.

The thin films of the present invention suitably transmit from about 5% to about 100% of radiation having a wavelength of between about 300 nm and about 700 nm. In some embodiments, the thin films transmit from about 25% to about 100% of radiation having a wavelength of between about 300 nm and about 700 nm, or, in some cases, even from about 50% to about 100% of radiation having a wavelength of between about 300 nm and about 700 nm.

In some embodiments, the at least one thin film transmits radiation having a wavelength of between about 300 nm and about 700 nm essentially uniformly across the range of wavelengths between about 300 nm and about 700 nm. As a non-limiting example, such a thin film according to the present invention transmits radiation having a wavelength of about 350 nm at the same level as radiation having a wavelength of about 550 nm. In such embodiments, roofing articles having multiple colors—e.g., a roofing article comprising multiple colored regions—display those colors evenly, such that no one color of the article appears richer or more intense than other colors of that article. In other embodiments, the thin films transmit radiation having a wavelength of between about 300 nm and about 700 nm non-uniformly.

The thin films of the present articles also suitably reflect from about 1% to about 100% of NIR radiation. In some embodiments, the thin films reflect from about 10% to about 45% of NIR radiation, or even from about 30% to about 35% of NIR radiation. The claimed articles preferably reflect at least about 25% of NIR radiation.

The present articles also suitably have an emissivity of from about 75% to about 100% in the middle-IR range, or from about 85% to about 95%, or even of about 90%. Such substantial emissivity enables roofing materials made according to the claimed invention to at least partially avoid the "heat island" effect that can arise in sunny weather, as described elsewhere herein.

As used in the present specification and claims, L* is a description of the lightness of an article's color, as set forth in the 1976 CIELAB L* a* b* color space, wherein L*=0 signifies black and L*=100 indicates diffuse white, negative values of a* indicate green while positive values indicate magenta, and negative values of b* indicate blue and positive values of b* indicate yellow.

Roofing articles according to the present invention suitably include at least one thin film selected so as to provide a roofing article with an L* value of less than about 85, although in some embodiments, the at least one thin film is selected so as to provide a roofing article with an L* value of less than about 65. The optimal L* for a particular article will be dictated by the needs or preferences of the user.

In some embodiments of the present articles, the L*, a*, and b* values (or some combination thereof) of the thin film match or approximate the corresponding values of the underlying substrate. This may be done in order to optimize the color match between the thin film and the substrate.

Substrates suitable for use in the present articles include shingles, roofing membranes, shakes, tiles, coil stock, and the like. Synthetic and natural substrate materials are both considered suitable for the claimed articles.

Bituminous roofing products used as substrates are considered particularly suitable in the present invention. These materials are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand.

Typically, roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation and for aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheets in selected portions of the shingle to provide an enhanced visual appearance, or to simulate other types of roofing products. Alternatively, the sheets can be formed into membranes or roll goods for commercial or industrial roofing applications.

The bituminous material used in manufacturing roofing products is typically derived from a petroleum processing by-product such as pitch, "straight-run" bitumen, or "blown" bitumen. The bituminous material can be modified with extender materials such as oils, petroleum extracts, or petroleum residues. The bituminous material can include various modifying ingredients such as polymeric materials, such as SBS (styrene-butadiene-styrene) block copolymers, resins, flame-retardant materials, oils, stabilizing materials, antistatic compounds, and the like. Preferably, the total amount by weight of such modifying ingredients is not more than about 15% of the total weight of the bituminous material.

The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130° C. to about 160° C. The bituminous composition can also include a suitable filler, such as calcium carbonate, talc, carbon black, stone dust, or fly ash, preferably in an amount from about 10 percent to 70 percent by weight of the bituminous composite material. The optimal substrate material for a given application will be apparent to those of ordinary skill in the art.

The thin films of the present invention may include one or more various materials. Metal oxides, and high-index materials are considered suitable thin film materials. The thin films are suitably constructed so as to achieve the desired reflection of NIR (near-IR) radiation while also being sufficiently thin to maintain the desired color of the roofing article.

Suitable metal oxides include, inter alia, titanium oxides, zinc oxides, and zirconium oxides. Suitable combinations of metal oxides and dopants will be apparent to those of ordinary skill in the art; combinations of materials may be selected based on, inter alia, the materials' known transparency to visible light and reflectance of NIR radiation.

High refractive index materials are suitable for use in the thin films of the claimed articles. Such materials are typically chosen on the basis of the high optical index contrast between air and such materials. As non-limiting examples, $TiO_2$ and $Fe_2O_3$ are considered suitable high-index materials. Other high-index materials, will be known to those of ordinary skill in the art. $TiO_2$ ($n_{anastase}$=2.55 at $\lambda$=590 nm; $n_{rutile}$=2.903 at $\lambda$=590 nm) is considered especially suitable, on the ground that it has a particularly high refractive index and, at certain thicknesses, is essentially transparent in visible light.

Suitable high-index materials include those materials having a refractive index of at least about 1.5, at least about 2, or even greater. A number of metal oxides, minerals, and the like possess such an index and will be easily identified by those of ordinary skill in the art.

The roofing articles may also include sealants, adhesives, binders, and other materials that are useful in assembling such articles or in maintaining the structural integrity of the articles. For example, the roofing articles may include one or more sealants to enhance the attachment of the thin film or films to the underlying substrate. As a non-limiting example, a sealant may be applied to an asphaltic substrate before application of the thin film so as to prevent diffusion of the materials in the thin film. Plastic substrates may also contain plasticizers or other additives to enhance their performance.

Algaecides, biocides, and other active agents may also be included in the claimed articles. The thin film may itself be selected to provide additional properties such as hydrophilic properties, photocatalytic effects, e.g., for self-cleaning, inhibition of microbial growth, or the like, to the roofing article.

The roofing articles may also include colorants, pigments, dyes, and the like. These additional components may be employed to enhance the aesthetic appeal of the roofing articles or to enhance the articles' performance.

Clear or colored coatings may, as desired, also be incorporated into the roofing articles. As one non-limiting example, a polymeric coating may be disposed atop at least a portion of a roofing article so as to provide mechanical or structural stability to the article and also impart chemical stability or weatherability. A non-limiting list of such coatings includes poly(meth)acrylates, polyurethanes, fluoropolymers, phosphates, titanates, zirconates, silicates such as metal silicates, silicas, and other polymers. Such coatings are applied by methods such as spraying, sonic spraying, ink jet printing, roll coating, curtain coating, or by extrusion coating. Other application methods will be known to those of ordinary skill in the art.

As described elsewhere herein, the roofing articles may include multiple thin film layers. The thin film layers may be of the same or different materials, and the optimal combination of thin films and thin film materials will dictated by the user's needs.

Also provided are methods of fabricating solar-reflective building materials, including roofing articles, decking, rails, siding, fencing, and the like. The disclosed methods include providing a substrate having an upper surface and disposing onto at least a portion of the upper surface of the substrate at least one thin film having a thickness in the range of from about 5 nm to about 5000 nm.

The at least one thin film suitably transmits from about 5% to about 100% of radiation having a wavelength of between about 300 nm and about 700 nm, and reflects from about 1% to about 100% of radiation having a wavelength of between about 700 nm and about 2500 nm. The thin films and processing conditions are suitably selected such that the resultant roofing articles suitably have an emissivity of at least about 75% in the medium-IR (wavelength >2500 nm) range, which allows for roofing articles that at least partially avoid the "heat island" effect described elsewhere herein.

The at least one thin film is suitably disposed onto the upper surface of the substrate by spraying, sol-gel spraying, electrospraying, chemical vapor deposition, or by plasma-enhanced chemical vapor deposition. Laminating, sputtering, electroplating, electroless plating, thermal spraying, physical vapor deposition, and plasma-assisted physical vapor deposition are also considered suitable deposition methods. Methods of applying thin films to other substrates, such as glass, are known in the art.

Figure 2:
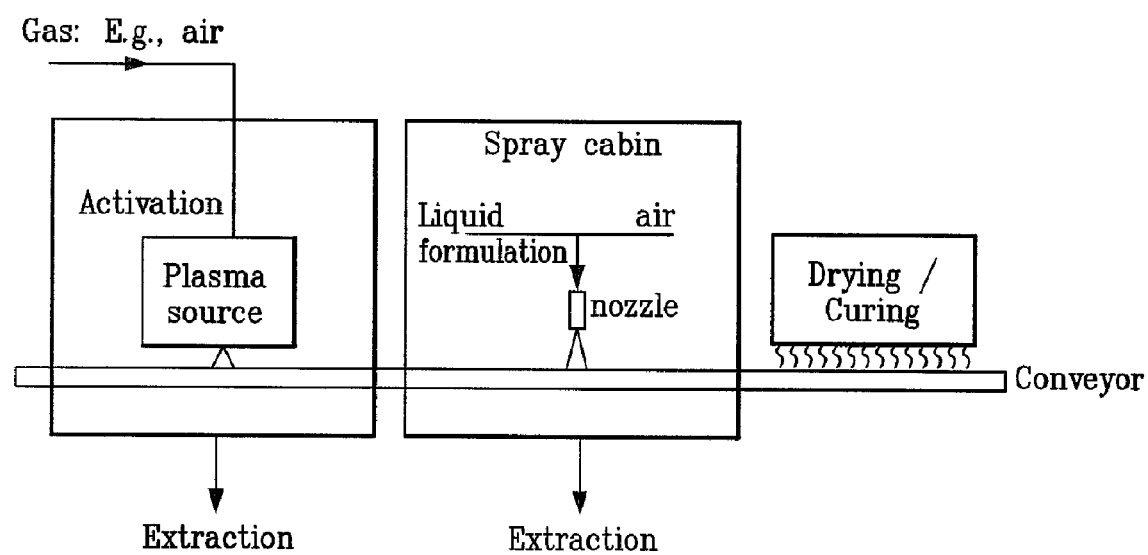
FIG. 2 depicts an exemplary, non-limiting sol-gel process for disposing a thin film atop a substrate to give rise to roofing articles according to the present invention.

One exemplary, non-limiting deposition process according to the claimed invention is shown in FIG. 2. In that figure, a conveyor belt transports a substrate to a plasma source, where the plasma acts to prepare the surface for sol-gel deposition of the thin film.

The substrate is next transported to a spray cabin, wherein a liquid formulation of the thin film material is applied, e.g., by spraying, to the substrate. The material is then dried, e.g., with infrared radiation, or otherwise treated or cured to give rise to a thin film having the desired thickness. The process is suitably performed at about atmospheric pressure and at or below about 100° C., or even below about 80° C., although higher temperatures may be suitable.

Figure 3:
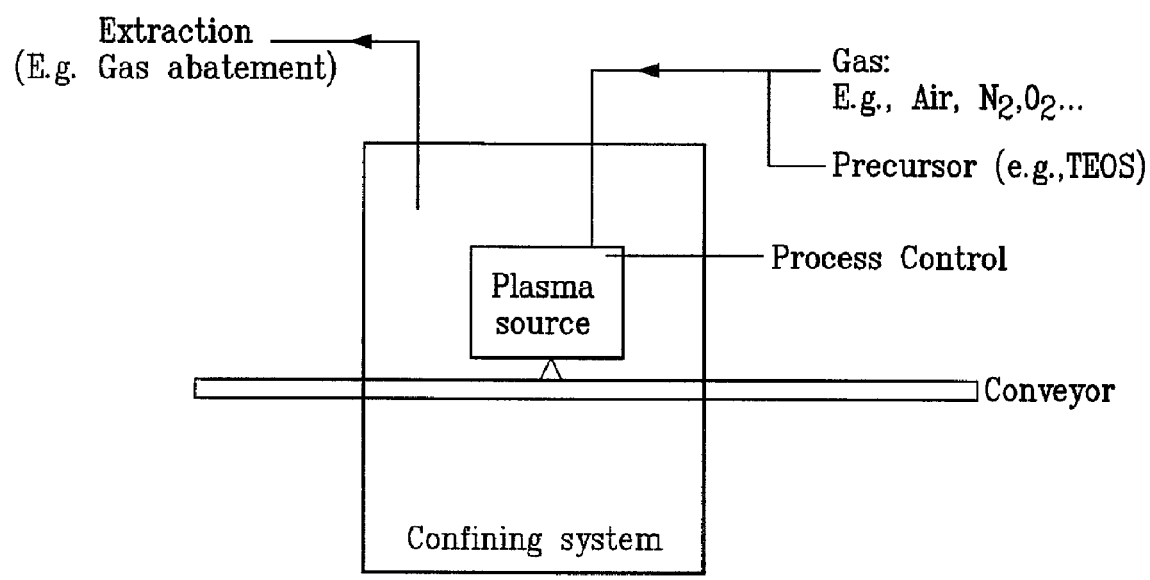
FIG. 3 depicts an exemplary, non-limiting plasma-based process for disposing a thin film atop a substrate to give rise to roofing articles according to the present invention.

FIG. 3 depicts an alternative, non-limiting process for plasma-based deposition of a thin film to a substrate. As shown in that figure, a conveyor transports the substrate to a confined zone. Within the confined zone, the substrate is then controllably exposed to a fluid or gas—e.g., air, nitrogen, oxygen, and the like—along with a film-forming material.

In the example of FIG. 3, the film-forming material is tetraethyl orthosilicate ("TEOS"), although other materials are within the scope of the claimed invention. Within the confined zone, the gas and film-forming material are exposed to a plasma source, which exposure gives rise to a reactive material forming a thin film of the desired thickness. The process is suitably performed at about atmospheric pressure. As further shown in FIG. 3, excess reactive materials and gases may be extracted from the confining system.

In some embodiments, disposition of the thin film onto the upper surface of the substrate is performed at less than about 200° C. In other embodiments, the disposition is performed at less than about 100° C., or even at less than 80° C. Disposition at temperatures of less than about 80° C. is preferable, for example, where the substrate is bituminous or asphaltic in nature and may not be capable of extended exposure to higher temperatures.

Disposition is also suitably performed at about or greater than atmospheric pressure, although deposition at reduced pressures is contemplated. Atmospheric or increased-pressure deposition is typically employed where the substrate—e.g. an asphaltic shingle—may be adversely impacted by reduced pressure or vacuum.

The thin films of the present process suitably have a thickness in the range of from about 10 nm to about 1000 nm, or from 5 nm to about 750 nm, or even from about 20 nm to about 500 nm. As described elsewhere herein, the optimal thickness will depend on the needs of the user and the desired durability or mechanical strength of the finished article; typical articles have thin films with a thickness in the range of from 20 nm to about 500 nm.

The thin films suitably transmit from about 25% to about 100% of visible light radiation. Thin films that transmit from about 50% to about 100% of visible light radiation, or even from about 75% to about 100% of visible light radiation are also suitable.

As described elsewhere herein, the thin films suitably transmit visible light radiation essentially uniformly across the wavelength range of from about 300 nm to about 700 nm. In some embodiments, the thin films are chosen to as to transmit visible light radiation in a non-uniform manner across the wavelength range of from about 300 nm to about 700 nm.

The thin films of the present articles also suitably reflect from about 1% to about 100% of NIR radiation. In some embodiments, the thin films—or the articles as a whole—reflect from about 10% to about 45% of NIR radiation, or even from about 30 to about 35% of NIR radiation. The articles preferably reflect at least about 25% of NIR radiation.

The articles also suitably have an emissivity of from about 75% to about 100% in the middle-IR range, or from about 85% to about 95%, or even of about 90%. Such substantial emissivity enables roofing materials made according to the claimed invention to at least partially avoid the "heat island" effect that can arise in sunny weather, as described elsewhere herein.

As described elsewhere herein, the thin films of the present process are typically selected so as to provide a finished article having a L* value of less than about 85, or even a L* value of less than about 65. The a*, b*, L*, or any of these values the thin film may be matched to the corresponding value or values of the substrate, as described elsewhere herein.

The provided processes are suitably applied to a variety of substrates, including shingles, roofing membranes, shakes, tiles, coil stock, and the like. Asphaltic and bituminous substrate materials are considered suitable substrate materials for the present invention, under appropriate process conditions. In some embodiments, the substrate or the thin film includes an adhesive or sealant to bond the substrate and film together. In other embodiments, an adhesive or sealant is disposed between the film and substrate to bond the two.

Materials suitable for the thin films of the disclosed processes are described elsewhere herein. Such materials include, inter alia, metal oxides, and high-index materials.

The disclosed processes also include application of a sealant, a binder, an adhesive, a biocide, an algaecide, and the like to the substrate, to the thin film, or to both to improve the mechanical or structural properties of the finished article. Clear or protective coatings may also be applied to the finished articles to provide additional desirable properties or durability to the finished articles. Methods of applying such coatings include spraying and the like; the optimal method for applying coatings will be apparent to those of skill in the art.

Where warranted, the claimed methods also include preparation of the substrate surface before disposition of the thin film atop the substrate. Such preparation may include, e.g., cleaning the substrate by washing, pressure washing, steam cleaning, and the like. Excess granules and foreign matter are typically removed before application of the thin films.

The claimed invention is not limited to roofing materials, and includes a variety of opaque building materials that, in some cases, are used on building exteriors. Such materials suitably include roofing materials as well as siding materials, fencing materials, rail materials, decking materials, and the like.

The materials suitably include a substrate at least partially surmounted by at least one thin film having a thickness in the range of from about 5 nm to about 5000 nm. The film can be from about 100 to about 1000 nm in thickness, from 200 to about 500 nm in thickness, or even about 200 nm in thickness.

The thin film suitably transmits in the range of from about 5% to about 100% of radiation having a wavelength of between about 300 nm and about 700 nm in some embodiments. Films that transmit from about 20% to about 80% of such radiation, or even from about 35% to about 65% of such radiation are also suitable.

The thin film also suitably reflects from about 1% to about 100% of radiation having a wavelength of between about 700 nm and about 2500 nm. In some embodiments, the thin film reflects from about 20% to about 80% of such radiation, from about 35% to about 65% of such radiation, or even about 50% to about 60% of such radiation.

The article as a whole may also be configured to reflect from about 1% to about 100% of radiation having a wavelength of between about 700 nm and about 2500 nm, or from about 20% to about 80% of such radiation, from about 35% to about 65% of such radiation, or even about 50% to about 60% of such radiation.

The materials also suitably have an emissivity of at least about 75% for radiation having a wavelength of greater than about 2500 nm. In some embodiments, the emissivity is at least about 85%, 90% or even at least about 95% for such radiation.

EXAMPLES AND NON-LIMITING EMBODIMENTS

In one, non-limiting embodiment of the present invention, films of $TiO_2$ were deposited by spraying directly on shingles measuring 3 inches×3 inches by spraying various amounts of sol onto the shingles to form reflective coatings.

The sol was synthesized by adding 15.22 mL of titanium tetrabutoxide (Aldrich, www.sigmaaldrich.com, St. Louis, Mo., USA) in a drop-by-drop fashion to a mixture of 2.24 mL of acetyl acetone (VWR Prolabo, www.fr.vwr.com, France) and 62.54 mL of isopropanol. The resulting mixture was then stirred for one hour. The resulting final $TiO_2$ dry content—i.e., weight percentage of $TiO_2$ in the sol—was 10%.

The resulting articles were then exposed to solar radiation and their reflectance was monitored using the ASTM C-1549 method using a portable solar reflectometer (Devices & Services, Dallas, Tex., USA). The solar reflectance percentage ("SR") results achieved by this sol coating onto the described shingles were as follows:

| sol amount | SR (%) | L* | a* | b* |
|---|---|---|---|---|
| reference-shingle | 8 | 33.9 | 0.7 | 7.1 |
| 2 mL | 13 | 42.3 | 0.2 | 6.2 |
| 4 mL | 15 | 45.3 | −0.4 | 7.5 |
| 6 mL | 16 | 46.1 | −0.9 | 9.5 |

What is claimed:

1. A building material, comprising:
a substrate at least partially surmounted by at least one thin film having a thickness in the range of from about 5 nm to about 5000 nm,
the at least one thin film transmitting from about 5% to about 80% of radiation having a wavelength of between about 300 nm and about 700 nm, and
the at least one thin film reflecting from about 25% to about 60% of radiation having a wavelength of between about 700 nm and about 2500 nm.

2. The building material of claim 1, wherein the article has an emissivity of at least about 75% for radiation having a wavelength of greater than about 2500 nm.

3. The building material of claim 1, wherein the at least one thin film is characterized as having a thickness in the range of from about 20 nm to about 500 nm.

4. The building material of claim 1, wherein the at least one thin film transmits from about 25% to about 60% of radiation having a wavelength of between about 300 nm and about 700 nm.

5. The building material of claim 1, wherein the building material is selected from the group consisting of roofing materials, siding materials, fencing materials, rail materials, and decking materials.

6. The building material of claim 1, wherein the at least one thin film reflects from about 25% to about 50% of radiation having a wavelength of between about 700 nm and about 2500 nm.

7. The building material of claim 1, wherein the at least one thin film is selected so as to provide a building material with an L* value of less than about 85.

8. The building material of claim 1, wherein the building material comprises asphalt, a polymer, or any combination thereof.

9. The building material of claim 1, wherein the thin film comprises a material having a refractive index of at least about 1.5.

10. The building material of claim 9, wherein the material having a refractive index of at least about 1.5 comprises a metal oxide.

11. The building material of claim 1, wherein the building material comprises a material that bonds the thin film to the substrate, a photocatalytic material, an algaecide, a biocide, or any combination thereof.

12. A method of fabricating a solar-reflective building material, comprising:
providing a substrate having an upper surface; and
disposing onto at least a portion of the upper surface of the substrate at least one thin film having a thickness in the range of from about 5 nm to about 5000 nm,
the at least one thin film transmitting from about 5% to about 80% of radiation having a wavelength of between about 300 nm and about 700 nm, and
the at least one thin film reflecting from about 25% to about 60% of radiation having a wavelength of between about 700 nm and about 2500 nm.

13. The method of claim 12, wherein the thin film is selected such that the solar-reflective building material is characterized as having an emissivity of at least about 75% for radiation having a wavelength of greater than about 2500 nm.

14. The method of claim 12, wherein the at least one film is disposed onto the upper surface of the substrate by spraying, sol-gel spraying, electrospraying, chemical vapor deposition, plasma-enhanced chemical vapor deposition, laminating, sputtering, electroplating, electroless plating, thermal spraying, physical vapor deposition, plasma-assisted physical vapor deposition, or any combination thereof.

15. The method of claim 12, wherein the disposing of the at least one thin film onto the upper surface of the substrate is performed at less than about 100° C.

16. The method of claim 12, wherein the disposing of the at least one thin film onto the upper surface of the substrate is performed at about or less than about atmospheric pressure.

17. The method of claim 12, wherein the at least one thin film is characterized as having a thickness in the range of from about 20 nm to about 500 nm.

18. The method of claim 12, wherein the at least one thin film transmits from about 25% to about 70% of radiation having a wavelength of between about 300 nm and about 700 nm.

19. The method of claim 12, wherein the at least one thin film transmits radiation having a wavelength of between about 300 nm and about 700 nm essentially uniformly across the range of wavelengths between about 300 nm and about 700 nm.

20. The method of claim 12, further comprising including a material that bonds at least a portion of the thin film to the substrate, including a photocatalytic material, including an algaecide, including a biocide, or any combination thereof.

21. The method of claim 12, wherein the at least one thin film is selected so as to provide a roofing article with an L* value of less than about 85.

22. The method of claim 12, wherein the thin film comprises a material with a refractive index of at least about 1.5.

23. The method of claim 22, wherein the material with a refractive index of at least about 1.5 comprises a metal oxide.

24. The building material made according to claim 12.

25. A roofing article, comprising:
a shingle at least partially surmounted by a thin film having a thickness in the range of from about 20 nm to about 500 nm,
the thin film comprising a metal oxide,
the at least one thin film transmitting from about 5% to about 80% of radiation having a wavelength of between about 300 nm and about 700 nm, and
the at least one thin film reflecting from about 25% to about 60% of radiation having a wavelength of between about 700 nm and about 2500 nm.

26. The roofing article of claim 25, wherein the roofing article has an emissivity of at least about 75% for radiation having a wavelength of greater than about 2500 nm.

27. A method of fabricating a solar-reflective roofing shingle, comprising:
spraying a sol comprising a metal oxide onto at least a portion of a shingle,
processing the sol to give rise to a thin film having a thickness in the range of from about 50 nm to about 200 nm,
the at least one thin film transmitting from about 5% to about 80% of radiation having a wavelength of between about 300 nm and about 700 nm,
the at least one thin film reflecting from about 25% to about 60% of radiation having a wavelength of between about 700 nm and about 2500 nm,
at least a portion of the thin film being secured to the shingle.

28. The method of claim 27, the metal oxide being selected such that the solar-reflective roofing shingle has an emissivity of at least about 75% for radiation having a wavelength of greater than about 2500 nm.

29. An opaque building material, comprising:
a substrate at least partially surmounted by at least one metal oxide film deposited by a sol-gel process, the film having a thickness in the range of from about 5 nm to about 5000 nm,
the at least one thin film transmitting from about 5% to about 80% of radiation having a wavelength of between about 300 nm and about 700 nm, and
the at least one thin film reflecting from about 25% to about 60% of radiation having a wavelength of between about 700 nm and about 2500 nm.

30. The opaque building material of claim 29, wherein the opaque building material is selected from the group consisting of roofing materials, siding materials, fencing materials, rail materials, and decking materials.

31. The opaque building material of claim 29, wherein the opaque building material has an emissivity of at least about 75% for radiation having a wavelength of greater than about 2500 nm.

* * * * *